US012505677B2

(12) United States Patent
Nishimura et al.

(10) Patent No.: US 12,505,677 B2
(45) Date of Patent: Dec. 23, 2025

(54) INFORMATION PROCESSING DEVICE

(71) Applicants: TOYOTA JIDOSHA KABUSHIKI KAISHA, Aichi-ken (JP); NOMURA RESEARCH INSTITUTE, LTD., Tokyo (JP)

(72) Inventors: Kazuya Nishimura, Anjo (JP); Naoki Uenoyama, Kasugai (JP); Keiko Nakano, Kawasaki (JP); Yohei Nakanishi, Nagoya (JP); Takahiro Matsumura, Tokyo (JP)

(73) Assignees: TOYOTA JIDOSHA KABUSHIKI KAISHA, Aichi-Ken (JP); NOMURA RESEARCH INSTITUTE, LTD., Tokyo (JP)

( * ) Notice: Subject to any disclaimer, the term of this patent is extended or adjusted under 35 U.S.C. 154(b) by 0 days.

(21) Appl. No.: 18/784,937

(22) Filed: Jul. 26, 2024

(65) Prior Publication Data

US 2025/0046099 A1 Feb. 6, 2025

(30) Foreign Application Priority Data

Aug. 1, 2023 (JP) ................................ 2023-125425

(51) Int. Cl.
*G06V 20/58* (2022.01)
*G06T 7/70* (2017.01)

(52) U.S. Cl.
CPC ................ *G06V 20/58* (2022.01); *G06T 7/70* (2017.01)

(58) Field of Classification Search
CPC ...................................................... G06V 20/58
USPC .......................................................... 348/148
See application file for complete search history.

(56) References Cited

U.S. PATENT DOCUMENTS

2020/0097740 A1* 3/2020 Hashimoto ............... G06T 7/70

FOREIGN PATENT DOCUMENTS

JP 2020-113070 A 7/2020

* cited by examiner

*Primary Examiner* — Amir Shahnami
(74) *Attorney, Agent, or Firm* — HAUPTMAN HAM, LLP

(57) ABSTRACT

An information processing device includes a processor. The processor obtains a peripheral image including a road mirror. The peripheral image is generated when an image capturing unit mounted on a first vehicle captures an image of a periphery of the first vehicle. When the processor determines that at least one of a second vehicle and a pedestrian approaching an installation spot of the road mirror from a direction that differs from a direction in which the first vehicle is approaching the installation spot of the road mirror is shown in a mirror surface of the road mirror captured in the obtained peripheral image, the processor determines that an orientation of the road mirror is not abnormal.

7 Claims, 5 Drawing Sheets

INFORMATION PROCESSING DEVICE

CROSS-REFERENCE TO RELATED APPLICATIONS

This application is based upon and claims the benefit of priority from prior Japanese Patent Application No. 2023-125425, filed on Aug. 1, 2023, the entire contents of which are incorporated herein by reference.

BACKGROUND

1. Field

The following description relates to an information processing device.

2. Description of Related Art

A vehicle includes an image capturing unit that captures an image of the periphery of the vehicle. When the vehicle is traveling on a road, a peripheral image generated by the image capturing unit may include a road mirror installed on the road. Japanese Laid-Open Patent Publication No. 2020-113070 discloses a technique that identifies a road mirror having poor visibility from a peripheral image including the road mirror and correct answer data indicating the road mirror mounted at a normal position, height, and angle.

The above technique cannot determine whether the orientation of the road mirror is normal without the correct answer data of the road mirror mounted at a normal position, height, and angle.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an information processing device is provided. The information processing device includes a processor. The processor is configured to obtain a peripheral image including a road mirror installed on a road on which a first vehicle travels. The peripheral image is generated when an image capturing unit mounted on the first vehicle captures an image of a periphery of the first vehicle. When the processor determines that at least one of a second vehicle and a pedestrian approaching an installation spot of the road mirror from a direction that differs from a direction in which the first vehicle is approaching the installation spot of the road mirror is shown in a mirror surface of the road mirror captured in the obtained peripheral image, the processor is configured to determine that an orientation of the road mirror is not abnormal.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

Embodiment

An embodiment of an information processing device will now be described with reference to FIGS. 1 to 6.

Configuration of Information Processing System 1

Figure 1:
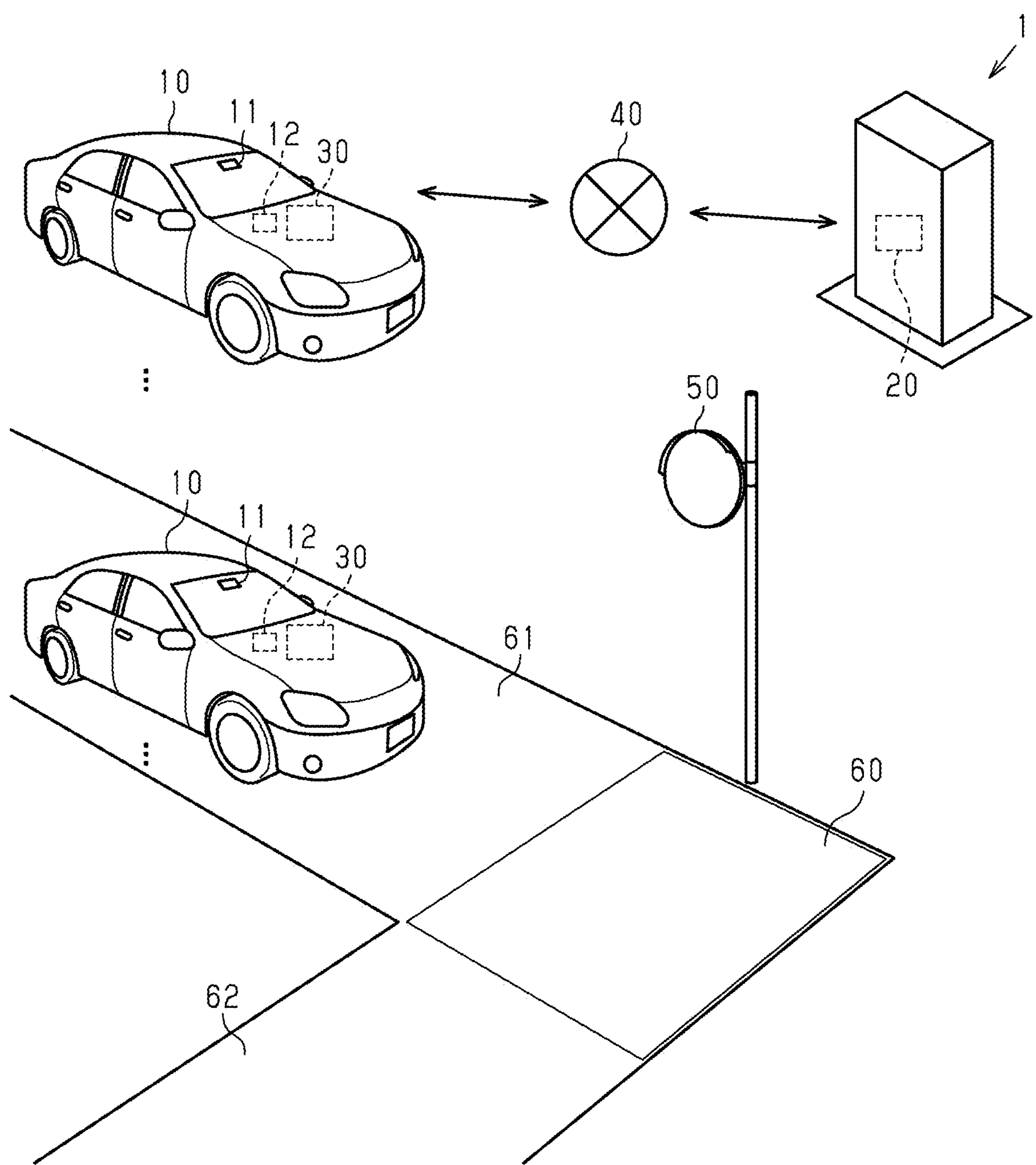
FIG. 1 is a diagram illustrating an information processing system.

As shown in FIG. 1, an information processing system 1 includes, for example, one or more vehicles 10 and one or more server devices 20. The server device 20 is an example of an information processing device. Specifically, the server device 20 executes a process that determines whether the orientation of a road mirror 50 installed on a road is normal.

Road Mirror 50

The road mirror 50 is installed at a spot on a road where visibility is poor. For example, the road mirror 50 is installed at an intersection or a curve. A spot of a road where the road mirror 50 is installed may be referred to as "installation spot 60". The road mirror 50 assists a driver of the vehicle 10 approaching the installation spot 60 from a first direction to check whether there is another vehicle or a pedestrian approaching the installation spot 60 from a second direction that differs from the first direction. Further, the road mirror 50 assists the driver of the vehicle 10 approaching the installation spot 60 from the second direction to check whether there is another vehicle or a pedestrian approaching the installation spot 60 from the first direction.

The first direction corresponds to, for example, a leftward direction with respect to a width direction of the mirror surface of the road mirror 50 as viewed from the front. The second direction corresponds to, for example, a rightward direction with respect to the width direction of the mirror surface of the road mirror 50 as viewed from the front. The vehicle 10 approaching the installation spot 60 from the first direction is an example of a first vehicle. The vehicle 10 approaching the installation spot 60 from the second direction is an example of a second vehicle. The first direction and the second direction are merely examples and are not limited to the above description. For example, the left-right relationship may be reversed.

In the example shown in FIG. 1, the installation spot 60 of the road mirror 50 is an intersection at which a first road 61 meets a second road 62. In this case, the driver of the vehicle 10 approaching the installation spot 60 from the first road 61 uses the road mirror 50 to check whether there is another vehicle or a pedestrian approaching the installation spot 60 from the second road 62. Further, the driver of the vehicle 10 approaching the installation spot 60 from the second road 62 uses the road mirror 50 to check whether there is another vehicle or a pedestrian approaching the installation spot 60 from the first road 61.

In the example shown in FIG. 1, the first direction corresponds to a direction in which a vehicle on the first road 61 would approach the installation spot 60 of the road mirror 50. Further, the second direction corresponds to a direction in which a vehicle on the second road 62 would approach the installation spot 60.

Configuration of Vehicle 10

The vehicle 10 includes, for example, an image capturing unit 11, a position information acquisition unit 12, and a controller 30.

The image capturing unit 11 is, for example, a digital camera that uses a solid-state imaging element such as a charge coupled device (CCD), a complementary metal oxide semiconductor (CMOS), or the like. An example of the image capturing unit 11 is a digital camera included in a driving recorder. The image capturing unit 11 captures an image of the periphery of the vehicle 10. Depending on where the image capturing unit 11 is arranged on the vehicle 10, the image capturing unit 11 captures an image of the front, rear, or side of the vehicle 10. The image capturing unit 11 generates a peripheral image by capturing an image of the periphery of the vehicle 10. When the vehicle 10 approaches the installation spot 60 of the road mirror 50, the peripheral image generated by the image capturing unit 11 may include the road mirror 50.

The position information acquisition unit 12 is, for example, a global navigation satellite system (GNSS) receiver. The position information acquisition unit 12 determines the position of the vehicle 10 from a signal received from a GNSS satellite and obtains position information indicating the position of the vehicle 10.

The controller 30 is connected to the server device 20 via a communication network 40 in a manner allowing for exchange of information. The communication network 40 includes, for example, the Internet, a wide area network (WAN), a local area network (LAN), a provider terminal, a wireless communication network, a wireless radio station, a leased line, or the like.

When the peripheral image generated by the image capturing unit 11 includes the road mirror 50, the controller 30 transmits the peripheral image to the server device 20.

Configuration of Controller 30

Figure 2:
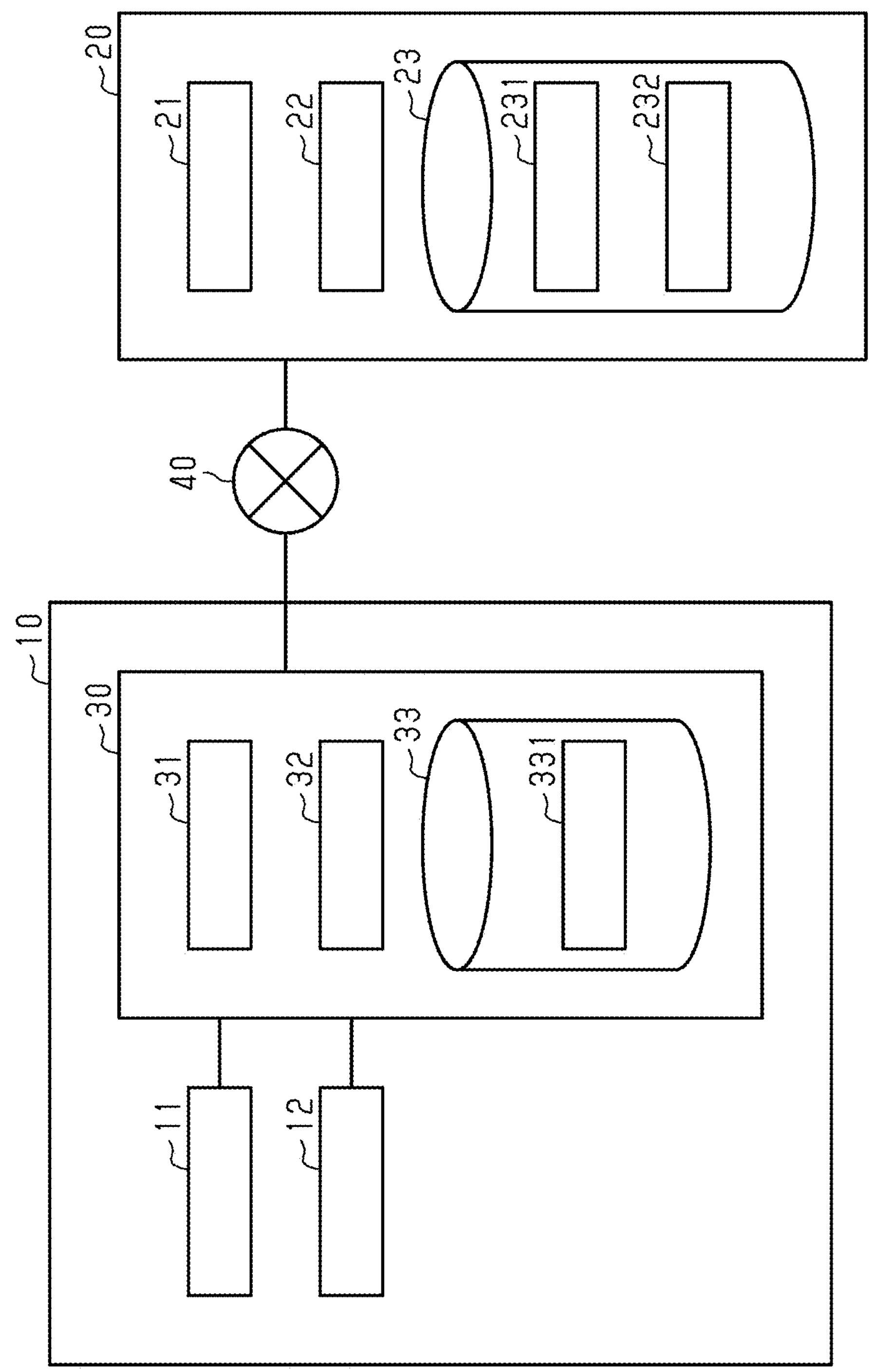
FIG. 2 is a diagram showing an example of the configuration of a server device and a controller.

As shown in FIG. 2, the controller 30 includes, for example, a processing circuit 31, a communication unit 32, and a storage unit 33. The processing circuit 31 includes, for example, a hardware processor such as a central processing unit (CPU). The processing circuit 31 performs various types of processes when the hardware processor runs programs. The programs may be stored in the storage unit 33 in advance. The storage unit 33 includes, for example, a non-transitory storage medium such as a hard disk drive (HDD), a flash memory, or the like. The communication unit 32 includes, for example, a communication circuit or a communication module. The communication unit 32 transmits and receives various types of data to and from the server device 20 and other devices in accordance with control executed by the processing circuit 31.

The storage unit 33 stores, for example, a learned model 331. The learned model 331 is a machine-learned model that determines whether the peripheral image generated by the image capturing unit 11 includes the road mirror 50. An example of the learned model 331 is a neural network. When a peripheral image is input to the learned model 331 as an input variable, the learned model 331 outputs an output variable indicating a probability that the peripheral image includes the road mirror 50. For example, as the probability that the peripheral image includes the road mirror 50 becomes higher, the learned model 331 outputs a larger value as the output variable. In this case, when the output variable is greater than or equal to a threshold value, the processing circuit 31 of the controller 30 determines that the peripheral image includes the road mirror 50. When the output variable is less than the threshold value, the processing circuit 31 determines the peripheral image does not include the road mirror 50. The processing circuit 31 causes the communication unit 32 to transmit to the server device 20 the peripheral image that has been determined to include the road mirror 50, and the position information of a position at which the peripheral image was captured.

Configuration of Server Device 20

As shown in FIG. 2, the server device 20 includes, for example, a processing circuit 21, a communication unit 22, and a storage unit 23. The processing circuit 21 includes, for example, a hardware processor such as a CPU. The processing circuit 21 performs various types of processes when the hardware processor runs programs. The programs may be stored in the storage unit 23 in advance. The storage unit 23 includes, for example, a non-transitory storage medium such as a hard disk drive (HDD), a flash memory, or the like. The communication unit 22 includes, for example, a communication circuit or a communication module. The communication unit 22 transmits and receives various types of data to and from the controller 30 or other devices in accordance with control executed by the processing circuit 21.

The storage unit 23 stores, for example, a learned model 231 and road mirror information 232. The learned model 231 is a machine-learned model that performs instance segmentation on objects shown in the mirror surface of the road mirror 50. An example of the learned model 231 is a convolutional neural network (CNN). When a peripheral image is input to the learned model 231 as an input variable, the learned model 231 outputs a segmentation result that indicates objects shown in the mirror surface of the road mirror 50 within a range of pixels constituting the mirror surface in the peripheral image. Such segmentation identifies, for example, other vehicles, pedestrians, bicycles, roadside trees, roads, sidewalks, traffic lights, pavement markings, road signs, buildings, or the like that may be present around the road mirror 50.

Hereafter, it is assumed that the instance segmentation performed by the learned model 231 distinguishes an object shown in the mirror surface of the road mirror 50 captured in the peripheral image from an object captured in the peripheral image outside the mirror surface of the road mirror 50. Thus, it is identifiable whether the vehicle shown in the mirror surface of the road mirror 50 is a subject vehicle or another vehicle. The subject vehicle refers to the vehicle 10 including the image capturing unit 11 that generated the peripheral image, which is the original data for the segmentation result.

Specifically, when the captured mirror surface of the road mirror 50 is shown facing frontward in the peripheral image, the learned model 231 identifies that the vehicle shown in the mirror surface of the road mirror 50 is the subject vehicle. When the road mirror 50 is tilted from normal orientation, the mirror surface of the road mirror 50 will face the vehicle 10 on which the image capturing unit 11 is mounted. Thus, the peripheral image shows the mirror surface of the road mirror 50 that is facing frontward. On the other hand, when the captured mirror surface of the road mirror 50 is not shown facing frontward in the peripheral image, the learned model 231 identifies that the vehicle shown in the mirror surface of the road mirror 50 is another vehicle. When the road mirror 50 is in normal orientation, the mirror surface of the road mirror 50 will not face the vehicle 10 on which the image capturing unit 11 is mounted. Thus, the peripheral image shows the mirror surface of the road mirror 50 that is not facing frontward. Specifically, the peripheral image shows the road mirror 50 having the mirror surface directed toward the center of the first direction and the second direction. The mirror surface of the road mirror 50 basically has a circular shape. For example, the learned model 231 distinguishes the subject vehicle from other vehicles based on whether the circular shape of the mirror surface of the road mirror 50 is a perfect circle or an ellipse. The road mirror information 232 will be described in detail later.

When the processing circuit 21 receives the peripheral image and the position information from the controller 30, the processing circuit 21 inputs the peripheral image to the learned model 231. Then, the processing circuit 21 obtains a segmentation result as the output of the learned model 231. The processing circuit 21 determines, from the segmentation result, whether at least one of another vehicle and a pedestrian is shown in the mirror surface of the road mirror 50.

When at least one of another vehicle and a pedestrian is included in the segmentation result, the processing circuit 21 determines that at least one of another vehicle and a pedestrian is shown in the mirror surface of the road mirror 50. When the processing circuit 21 determines that at least one of another vehicle and a pedestrian is shown in the mirror surface of the road mirror 50, the processing circuit 21 determines that the orientation of the road mirror 50 is not abnormal.

Figure 3:
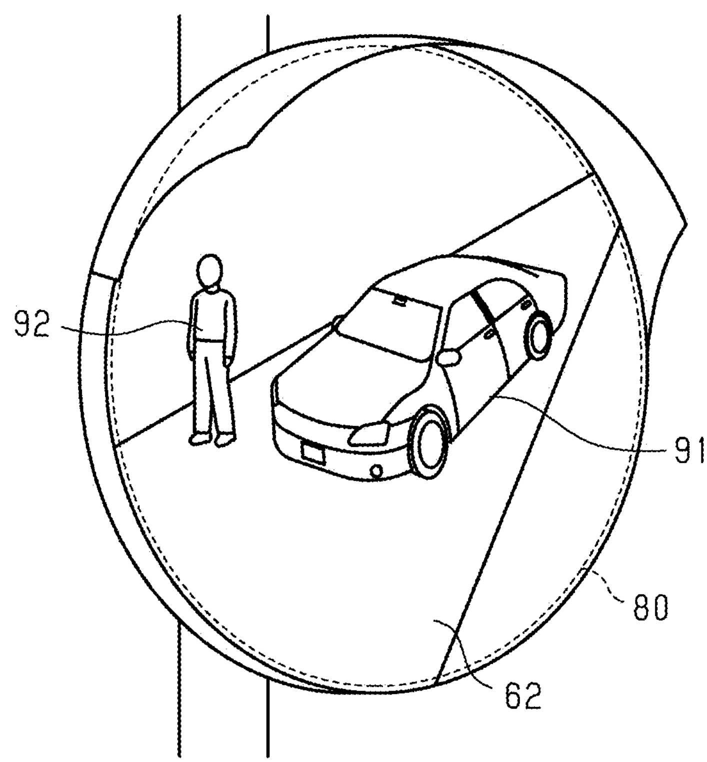
FIG. 3 is a diagram partially enlarging a peripheral image including a road mirror in normal orientation.
Figure 4:
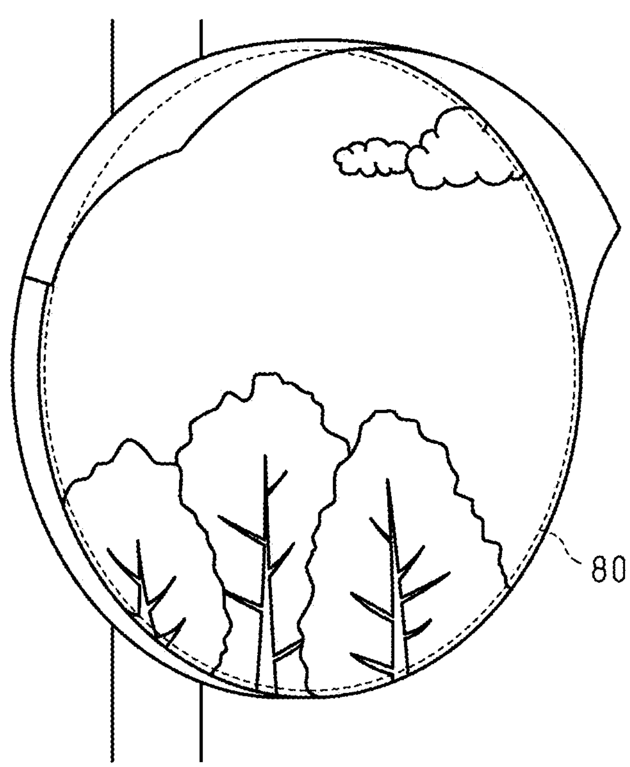
FIG. 4 is a diagram partially enlarging a peripheral image including a road mirror in abnormal orientation.

FIGS. 3 and 4 are enlarged views of peripheral images, which are captured and generated by the image capturing unit 11 of the vehicle 10 traveling on the first road 61, showing a range 80 of the mirror surface of the road mirror 50. As shown in FIG. 3, when the orientation of the road mirror 50 is normal, the second road 62, another vehicle 91 traveling on the second road 62, and a pedestrian 92 walking on the second road 62 are shown in the range 80 of the mirror surface. Accordingly, the segmentation result includes the other vehicle, the pedestrian, the road, and the like. Thus, the processing circuit 21 determines, based on the segmentation result, that at least one of another vehicle 91 and a pedestrian 92 is shown in the mirror surface of the road mirror 50 and that the orientation of the road mirror 50 is not abnormal.

As shown in FIG. 4, when the orientation of the road mirror 50 is abnormal, none of the second road 62, the other vehicle 91 traveling on the second road 62, and the pedestrian 92 walking on the second road 62 are shown in the range 80 of the mirror surface. Depending on the orientation of the road mirror 50, the road mirror 50 may show only the sky or street trees. The objects shown in the range 80 of the mirror surface when the orientation of the road mirror 50 is abnormal are merely examples. The range 80 of the mirror surface may show the first road 61 or the subject vehicle 10 traveling on the first road 61. Alternatively, the range 80 of the mirror surface may show only the ground. In any case, when the orientation of the road mirror 50 is abnormal, other vehicles and pedestrians are absent from the segmentation result. Thus, the processing circuit 21 determines, based on the segmentation result, that another vehicle 91 and a pedestrian 92 are not shown in the mirror surface of the road mirror 50.

Even when the orientation of the road mirror 50 is normal, if the other vehicle 91 and the pedestrian 92 are absent from the second road 62, neither the other vehicle 91 nor the pedestrian 92 is shown in the range 80 of the mirror surface. Accordingly, when the processing circuit 21 determines that neither the other vehicle 91 nor the pedestrian 92 is shown in the mirror surface of the road mirror 50, the processing circuit 21 calculates, from the segmentation result, a ratio of the road within the range 80 of the mirror surface of the road mirror 50 captured in the peripheral image. The processing circuit 21 determines whether the calculated ratio is greater than or equal to a predetermined ratio.

When the orientation of the road mirror 50 is abnormal, the mirror surface of the road mirror 50 may not show any road. Even if a road is shown in the mirror surface of the road mirror 50, the ratio may be very small. In such a case, even when there is a vehicle or a pedestrian on the road, the vehicle or the pedestrian may not be shown in the mirror surface of the road mirror 50. Accordingly, the predetermined ratio is, for example, set as a reference for determining whether a vehicle or a pedestrian on the road is shown in the mirror surface.

The predetermined ratio is determined in advance based on a peripheral image that satisfies, for example, conditions (A1) and (A2).

(A1) The image was captured and generated by the image capturing unit 11 in a case where the orientation of the road mirror 50 is normal.

(A2) The image does not include another vehicle 91 or a pedestrian 92 in the second direction.

Specifically, the predetermined ratio is a ratio of the pixels of the road to the pixels of the range 80 of the mirror surface of the road mirror 50 captured in the peripheral image that satisfies the conditions (A1) and (A2). The predetermined ratio includes, for example, a statistical value of a ratio obtained from a plurality of peripheral images that are captured at various locations and satisfy the conditions (A1) and (A2).

When the processing circuit 21 determines that the calculated ratio is greater than or equal to the predetermined ratio, the processing circuit 21 determines that the orientation of the road mirror 50 is not abnormal. On the other hand, when the processing circuit 21 determines that the calculated ratio is less than the predetermined ratio, the processing circuit 21 determines that the orientation of the road mirror 50 is abnormal.

The processing circuit 21 updates the road mirror information 232 in accordance with the determination result. The road mirror information 232 includes one or more records in each of which identification information of the road mirror 50, information indicating an approaching direction in which the vehicle 10 approaches the installation spot 60 of the road mirror 50, and information indicating a determination result of the orientation of the road mirror 50 are associated with one another. The identification information of the road mirror 50 is, for example, information indicating the installation spot 60 of the road mirror 50.

The processing circuit 21 searches the road mirror information 232 using the position information obtained from the controller 30 as a search key to find a record related to the road mirror 50 that is subject to determination. Specifically, the processing circuit 21 finds, as the record of the subject road mirror 50, a record of the road mirror 50 having the identification information that indicates a position within a predetermined distance from the position corresponding to the position information. Further, the processing circuit 21 uses the positional relationship between the position information and the identification information to identify the approaching direction in which the vehicle 10 that transmitted the position information is approaching the installation spot 60 of the road mirror 50. As described above, the direction in which the vehicle 10 approaches the installation spot 60 of the road mirror 50 is the first direction or the second direction. The processing circuit 21 updates the road mirror information 232 by generating or updating the record of the subject road mirror 50 in accordance with the identified approaching direction and the determination result of the orientation of the road mirror 50.

The processing circuit 21 determines that the orientation of the road mirror 50 is normal for the road mirror 50 that satisfies both conditions (B1) and (B2) based on the updated road mirror information 232.

(B1) The orientation of the road mirror 50 was determined as not abnormal from a peripheral image generated by the image capturing unit 11 of the first vehicle approaching the installation spot 60 of the road mirror 50 from the first direction.

(B2) The orientation of the road mirror 50 was determined as not abnormal from a peripheral image generated by the image capturing unit 11 of the second vehicle approaching the installation spot 60 of the road mirror 50 from the second direction.

The processing circuit 21 determines whether both conditions (B1) and (B2) are satisfied for each record of the updated road mirror information 232. Then, the processing circuit 21 determines that the orientation of the road mirror 50 is normal for the road mirror 50 that satisfies both of the above conditions.

Processing by Controller 30

Figure 5:
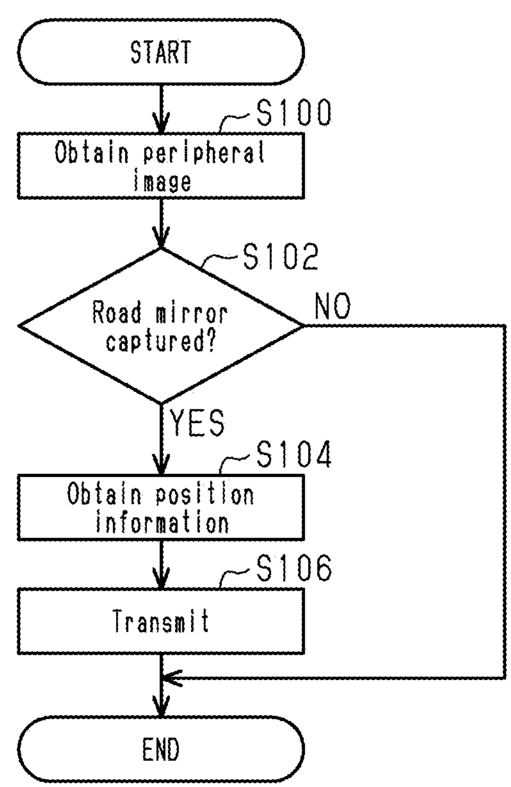
FIG. 5 is a flowchart illustrating an example of a process executed by the controller.

A series of processes executed by the controller 30 to transmit a peripheral image including the road mirror 50 to the server device 20 will now be described with reference to FIG. 5. The processing circuit 31 executes the series of processes in predetermined control cycles.

The processing circuit 31 obtains a peripheral image generated by the image capturing unit 11 (step S100). The processing circuit 31 determines whether the obtained peripheral image includes the road mirror 50 (step S102). When the processing circuit 31 determines that the peripheral image does not include the road mirror 50 (step S102; NO), there is no information to be transmitted to the server device 20. Thus, the processing circuit 31 ends processing. When the processing circuit 31 determines that the peripheral image includes the road mirror 50 (step S102; YES), the processing circuit 31 obtains position information from the position information acquisition unit 12 (step S104). The position information obtained by the processing circuit 31 in step S104 is the position information of the vehicle 10 at a time point at which the image capturing unit 11 generated the peripheral image obtained in step S100. The processing circuit 31 causes the communication unit 32 to transmit the obtained peripheral image and the obtained position information to the server device 20 (step S106). Then, the processing circuit 31 ends processing.

Processing by Server Device 20

A series of processes executed by the server device 20 to determine whether the orientation of the road mirror 50 is normal based on the peripheral image received from the vehicle 10 will now be described with reference to FIG. 6. When the communication unit 22 receives a peripheral image from the vehicle 10, the processing circuit 21 of the server device 20 starts processing.

The processing circuit 21 obtains the peripheral image and the position information transmitted from the controller 30 of the vehicle 10 (step S200). The processing circuit 21 inputs the obtained peripheral image to the learned model 231 and obtains a segmentation result as the output of the learned model 231 (step S202). The processing circuit 21 determines whether at least one of another vehicle 91 and a pedestrian 92 is shown in the mirror surface of the road mirror 50 captured in the peripheral image (step S204). When the segmentation result includes at least one of another vehicle and a pedestrian, the processing circuit 21 determines that at least one of another vehicle 91 and a pedestrian 92 is shown in the mirror surface of the road mirror 50 captured in the peripheral image. When the segmentation result includes neither another vehicle nor a pedestrian, the processing circuit 21 determines that neither another vehicle 91 nor a pedestrian 92 is shown in the mirror surface of the road mirror 50 captured in the peripheral image.

When the processing circuit 21 determines that at least one of another vehicle 91 and a pedestrian 92 is shown in the mirror surface of the road mirror 50 captured in the peripheral image (step S204; YES), the processing circuit 21 determines that the orientation of the road mirror 50 is not abnormal (step S206). When the processing circuit 21 determines that neither another vehicle 91 nor a pedestrians 92 is shown in the mirror surface of the road mirror 50 captured in the peripheral image (step S204; NO), the processing circuit 21 calculates a ratio of the road within the range 80 of the mirror surface of the road mirror 50 captured in the peripheral image (step S208). The processing circuit 21 determines whether the calculated ratio is greater than or equal to the predetermined ratio (step S210). When the calculated ratio is greater than or equal to the predetermined ratio (step S210; YES), the processing circuit 21 determines that the orientation of the road mirror 50 is not abnormal (step S206). When the calculated ratio is less than the predetermined ratio (step S210; NO), the processing circuit 21 determines that the orientation of the road mirror 50 is abnormal (step S212).

The processing circuit 21 updates the road mirror information 232 in accordance with the determination result of step S206 or step S212 (step S214). Subsequently, the processing circuit 21 determines that the orientation of the road mirror 50 is normal for the road mirror 50 that satisfies both conditions (B1) and (B2) based on the updated road mirror information 232 (step S218). Then, the processing circuit 21 ends processing.

Operation and Advantages of Embodiment

The above embodiment has the following operation and advantages.

(1) When the vehicle 10 is traveling, the image capturing unit 11 generates a peripheral image by capturing an image of the periphery of the vehicle 10. When the vehicle 10 is approaching the installation spot 60 of the road mirror 50, the peripheral image generated by the image capturing unit 11 of the vehicle 10 may include the road mirror 50. The controller 30 obtains the generated peripheral image from the image capturing unit 11. In this case, when the controller 30 determines that the obtained peripheral image includes the road mirror 50, the controller 30 transmits the peripheral image to the server device 20.

The processing circuit 21 of the server device 20 obtains the peripheral image transmitted from the controller 30. Then, the processing circuit 21 determines whether at least one of another vehicle 91 and a pedestrian 92 is shown in the mirror surface of the road mirror 50 captured in the obtained peripheral image. When the processing circuit 21 determines that at least one of another vehicle 91 and a pedestrian 92 is shown in the mirror surface of the road mirror 50 captured in the obtained peripheral image, the processing circuit 21 determines that the orientation of the road mirror 50 is not abnormal. This configuration allows the server device 20 to determine whether the orientation of the road mirror 50 is normal using the peripheral image generated by the image capturing unit 11 without correct answer data of the road mirror 50 mounted at a normal position, height, and angle.

(2) When the vehicle 10 approaches the installation spot 60 of the road mirror 50 from the first direction, there may be no other vehicles or pedestrians approaching the installation spot 60 from the second direction. In this case, even when the orientation of the road mirror 50 is normal, neither another vehicle nor a pedestrian will be shown in the mirror surface of the road mirror 50. When the orientation of the road mirror 50 is normal, the road extending toward the installation spot 60 should be shown in the mirror surface of the road mirror 50. In other words, it can be assumed that the orientation of the road mirror 50 is abnormal when the road is not shown in the mirror surface of the road mirror 50, or when the road is shown in the mirror surface but the mirror surface mostly shows an object that is not the road.

Accordingly, the processing circuit 21 calculates the ratio of the road within the range 80 of the mirror surface of the road mirror 50 captured in the peripheral image. When the calculated ratio is greater than or equal to the predetermined ratio, the processing circuit 21 determines that the orientation of the road mirror 50 is not abnormal. This configuration allows the server device 20 to determine whether the orientation of the road mirror 50 is normal even when another vehicle 91 and a pedestrian 92 are absent from the area around the installation spot 60 of the road mirror 50.

(3) The processing circuit 21 refers to the road mirror information 232 and determines that the orientation of the road mirror 50 is normal if both of the conditions (B1) and (B2) are satisfied. The orientation of the road mirror 50 may be normal when viewed from the first direction, but may not be normal when viewed from the second direction. In other words, it can be assumed that the orientation of the road mirror 50 is normal only when the orientations viewed from both of the first and second directions are normal. This configuration allows the server device 20 to determine whether the orientation of the road mirror 50 is normal based on the road mirror information 232.

Modified Examples

The above embodiment may be modified as follows. The above embodiment and the following modifications can be combined as long as the combined modifications remain technically consistent with each other.

The image capturing unit 11 is configured to generate a video formed by a plurality of peripheral images that are chronologically consecutive. Thus, the processing circuit 31 may transmit, to the server device 20, a video including a peripheral image in which the road mirror 50 is determined to be captured. In this case, the processing circuit 31 generates a video with peripheral images that are consecutively captured/generated in a chronological order during a period from a predetermined time before a time point at which the peripheral image determined to include the road mirror 50 was captured/generated to a predetermined time after that time point. Then, in step S106 in FIG. 5, the processing circuit 31 transmits the generated video to the server device 20 together with the position information.

The processing circuit 21 of the server device 20 determines whether at least one of another vehicle 91 and a pedestrian 92 is shown in the mirror surface of the road mirror 50 captured in the obtained video. Specifically, when the video satisfies condition (C), the processing circuit 21 determines that at least one of another vehicle 91 and a pedestrian 92 is shown in the mirror surface of the road mirror 50 captured in the peripheral images.

(C) At least one of another vehicle 91 and a pedestrian 92 is shown in the mirror surface of the road mirror 50 for a duration that is longer than or equal to a predetermined period.

Figure 6:
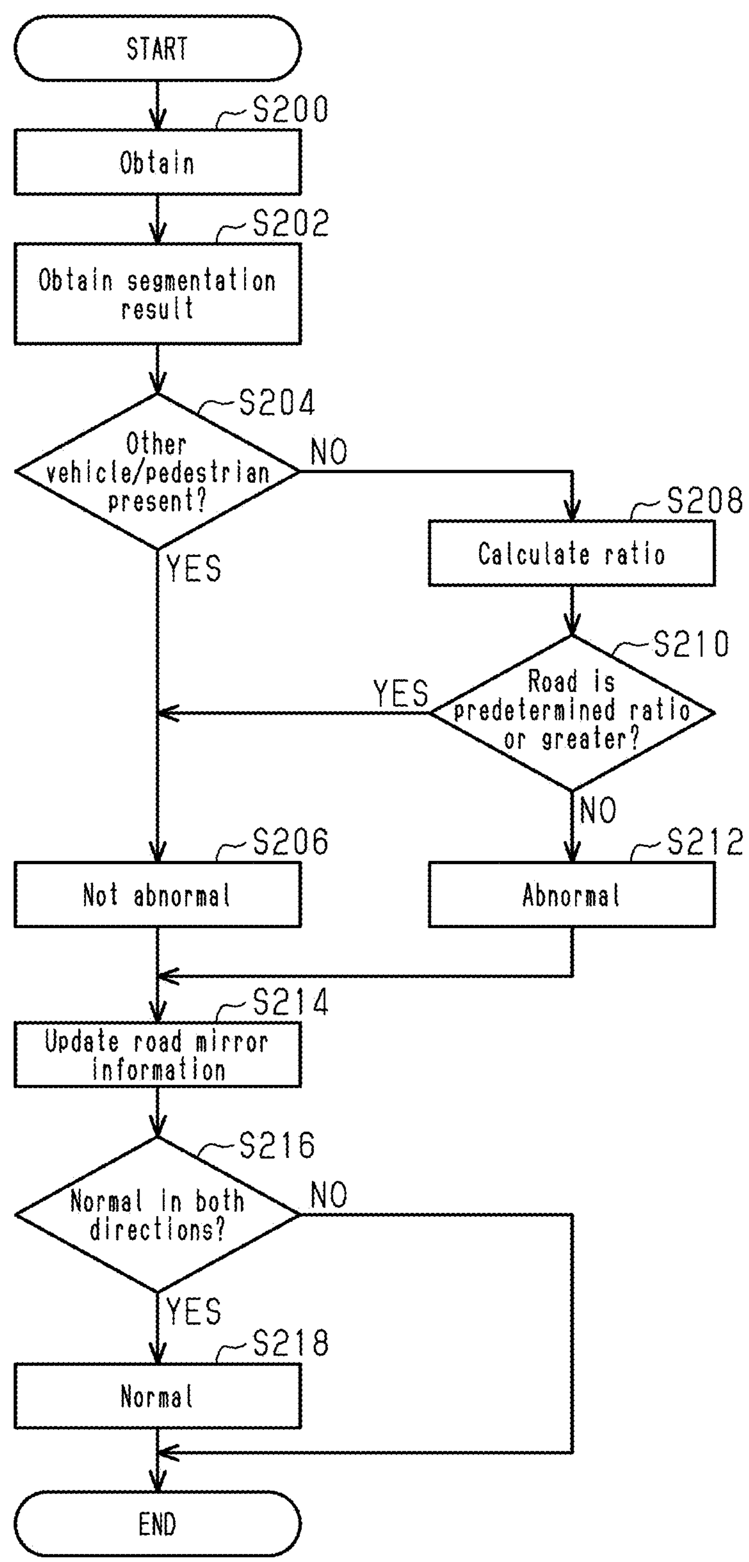
FIG. 6 is a flowchart illustrating an example of a process performed by the server device.

In step S202 of FIG. 6, the processing circuit 21 inputs each of the peripheral images forming the video to the learned model 231 as an input variable. The processing circuit 21 obtains segmentation results as the outputs of the learned model 231. Hereafter, the segmentation results corresponding to the peripheral images that are consecutively captured/generated in a chronological order will also be referred to as consecutive segmentation results.

The processing circuit 21 determines whether at least one of another vehicle and a pedestrian is included in the mirror surface of the road mirror 50 for each of the consecutive segmentation results. When at least one of another vehicle and a pedestrian is included in each of the consecutive segmentation results, the processing circuit 21 determines that the condition (C) is satisfied. Further, when other vehicles and pedestrians are absent from each of the consecutive segmentation results, the processing circuit 21 determines that the condition (C) is not satisfied. The processing circuit 21 may determine that the condition (C) is satisfied when at least one of another vehicle and a pedestrian is continuously included in a predetermined number of the segmentation results in accordance with a relationship between a frame rate of the video and the predetermined period. In this case, the predetermined number is a product of the frame rate and the predetermined period.

If the orientation of the road mirror 50 is normal, another vehicle 91 or a pedestrian 92 approaching the installation spot 60 of the road mirror 50 should be continuously shown in the mirror surface of the road mirror 50. When the video satisfies the condition (C), the processing circuit 21 determines that at least one of another vehicle 91 and a pedestrian 92 is shown in the mirror surface of the road mirror 50 captured in the peripheral image (step S204; YES). Further, when the video satisfies the condition (C), the processing circuit 21 determines that the orientation of the road mirror 50 is not abnormal (step S206). This allows the server device 20 to determine whether the orientation of the road mirror 50 is normal from the video.

The processing circuit 21 does not have to execute steps S214 to S128. The processing circuit 21 may execute steps S214 to S128 in predetermined time intervals as a series of processes separate from the series of processes illustrated in FIG. 6. In this case, the predetermined time corresponds to a length of time that allows for collection of a sufficient amount of determination results of the road mirrors 50.

The processing circuit 21 may output some or all of the determination results obtained in steps S206, S212, and S218 to an information terminal of a business entity that manages the road. Thus, the business entity can use the determination results related to the orientation of the road mirror 50 for maintenance and management of the road mirror 50.

Instead of or in addition to the process that uses the learned model 331 to determine whether a peripheral image includes the road mirror 50, the processing circuit 31 may use a result of general image analysis to determine whether a peripheral image includes the road mirror 50.

Instead of or in addition to the process that uses the learned model 231 to obtain a segmentation result, the processing circuit 21 may use a result of general image analysis to determine that at least one of another vehicle 91 and a pedestrian 92 is shown in the mirror surface of the road mirror 50.

The processing circuit 31 may transmit a peripheral image only when the server device 20 request the processing circuit 31 to transmit the peripheral image. In this case, the processing circuit 31 transmits the position information to the server device 20 in predetermined time intervals. When the server device 20 determines that the vehicle 10 is in the vicinity of the road mirror 50 based on the received position information, the server device 20 requests the vehicle 10 to provide a peripheral image. The processing circuit 31 transmits the peripheral image generated at a time point at which the server device 20 requested for the transmission.

The processing circuit 21 of the server device 20 may perform some of the various types of determinations performed by the processing circuit 31. In this case, whenever the image capturing unit 11 generates a peripheral image, the processing circuit 31 transmits the peripheral image and the position information that are associated with each other to the server device 20. This position information has been obtained by the position information acquisition unit 12 when the image capturing unit 11 generated the peripheral image. The processing circuit 21 determines whether the peripheral image received from the controller 30 includes the road mirror 50. When the processing circuit 21 determines that the peripheral image includes the road mirror 50, the processing circuit 21 executes the series of processes illustrated in FIG. 6 from step S202.

The controller 30 of the vehicle 10 may perform processes that correspond to the series of processes illustrated in FIG. 6. In this case, the controller 30 determines whether the orientation of the road mirror 50 is normal. That is, the controller 30 has a functionality of an information processing device.

Some or all of the elements of the processing circuit 21 and the processing circuit 31 may be implemented by hardware such as a large scale integration (LSI), an application specific integrated circuit (ASIC), a field-programmable gate array (FPGA), or a graphics processing unit (GPU), or may be implemented by cooperation of software and hardware.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An information processing device, comprising:
a processor configured to
obtain a peripheral image including a road mirror installed on a road on which a first vehicle travels, the peripheral image being generated when an image capturing unit mounted on the first vehicle captures an image of a periphery of the first vehicle, and
in response to determining that at least one of a second vehicle or a pedestrian approaching an installation spot of the road mirror from a direction that differs from a direction in which the first vehicle is approaching the installation spot of the road mirror is shown in a mirror surface of the road mirror captured in the obtained peripheral image, determine that an orientation of the road mirror is not abnormal.

2. The information processing device according to claim 1, wherein
the peripheral image is one of peripheral images that are chronologically consecutive, and the processor is configured to
obtain a video formed by the peripheral images, and
in response to determining that the at least one of
the second vehicle and the pedestrian is shown in the mirror surface of the road mirror captured in the video for a duration that is longer than or equal to a predetermined period, determine that the at least one of the second vehicle and the pedestrian is shown in the mirror surface of the road mirror captured in the peripheral image.

3. The information processing device according to claim 1, wherein
the processor is configured to
calculate a ratio of a road within a range of the mirror surface of the road mirror captured in the peripheral image to an entirety of the range of the mirror surface, and
in response to the calculated ratio being greater than or equal to a predetermined ratio, determine that the orientation of the road mirror is not abnormal.

4. The information processing device according to claim 1, wherein
the processor is configured to, in response to determining that
(i) the orientation of the road mirror is not abnormal from the peripheral image generated when the image capturing unit of the first vehicle approaching the installation spot of the road mirror from a first direction captured an image of a periphery of the first vehicle, and
(ii) the orientation of the road mirror is not abnormal from a peripheral image generated when an image capturing unit of the second vehicle approaching the installation spot from a second direction that differs from the first direction captured an image of a periphery of the second vehicle,
determine that the orientation of the road mirror is normal.

5. The information processing device according to claim 1, wherein the processor is configured to, in response to determining that the at least one of the second vehicle or the pedestrian is not shown in the mirror surface of the road mirror captured in the obtained peripheral image, calculate a ratio of a road within a range of the mirror surface of the road mirror captured in the peripheral image to an entirety of the range of the mirror surface, in response to the calculated ratio being greater than or equal to a predetermined ratio, determine that the orientation of the road mirror is not abnormal, and in response to the calculated ratio being less than the predetermined ratio, determine that the orientation of the road mirror is abnormal.

6. The information processing device according to claim 5, wherein the processor is configured to update road mirror information in accordance with a determination result of the orientation of the road mirror based on the at least one of the second vehicle or the pedestrian.

7. The information processing device according to claim 6, wherein the processor is configured to, subsequent to updating the road mirror information, in response to determining that (i) the orientation of the road mirror is not abnormal from the peripheral image generated when the image capturing unit of the first vehicle approaching the installation spot of the road mirror from a first direction captured an image of a periphery of the first vehicle, and (ii) the orientation of the road mirror is not abnormal from a peripheral image generated when an image capturing unit of the second vehicle approaching the installation spot from a second direction that differs from the first direction captured an image of a periphery of the second vehicle, determine that the orientation of the road mirror is normal.

* * * * *